US012617064B2

(12) United States Patent
Lee

(10) Patent No.: US 12,617,064 B2
(45) Date of Patent: May 5, 2026

(54) IMPACT TOOL HEAD

(71) Applicant: TIEN-I INDUSTRIAL CO., LTD., Taichung City (TW)

(72) Inventor: Larry Lee, Taichung City (TW)

(73) Assignee: TIEN-I INDUSTRIAL CO., LTD., Taichung City (TW)

( * ) Notice: Subject to any disclaimer, the term of this patent is extended or adjusted under 35 U.S.C. 154(b) by 378 days.

(21) Appl. No.: 18/356,142

(22) Filed: Jul. 20, 2023

(65) Prior Publication Data

US 2023/0364768 A1 Nov. 16, 2023

Related U.S. Application Data

(63) Continuation-in-part of application No. 17/395,185, filed on Aug. 5, 2021, now abandoned, which is a continuation-in-part of application No. 16/579,435, filed on Sep. 23, 2019, now Pat. No. 11,305,411.

(51) Int. Cl.
*B25D 17/02* (2006.01)
*B25D 17/08* (2006.01)

(52) U.S. Cl.
CPC .............. *B25D 17/02* (2013.01); *B25D 17/08* (2013.01); *B25D 2217/0034* (2013.01); *B25D 2217/0042* (2013.01)

(58) Field of Classification Search
CPC ................... B25D 17/02; B25D 17/08; B25D 2217/0034; B25D 2217/0042; B25D 2250/111; B25D 2250/321
See application file for complete search history.

(56) References Cited

U.S. PATENT DOCUMENTS 1,888,685 A 11/1932 Norling
2,453,536 A * 11/1948 Peck ..................... B25D 17/08 279/19
2,470,385 A 5/1949 Wenger
(Continued)

FOREIGN PATENT DOCUMENTS

TW I468268 B 1/2015
TW M507829 U 9/2015

OTHER PUBLICATIONS

Sonmez, F.O.; "Optimal Shape Design of Shoulder Fillets for Flat and Round Bars under Various Loading"; Feb. 24, 2009; Journal of Mechanical Engineering Science, vol. 223 Part C (Year: 2009).
(Continued)

*Primary Examiner* — Thanh K Truong
*Assistant Examiner* — David G Shutty
(74) *Attorney, Agent, or Firm* — MUNCY, GEISSLER, OLDS & LOWE, P.C.

(57) ABSTRACT

An impact tool head is provided and configured to be disposed on a front end of an impact tool. The impact tool head includes: a rod body and a flange radially protruding from the rod body. The flange includes an inclined flat surface facing toward the front end and an outermost peripheral edge. A contact position is defined as a position where the inclined flat surface contact with at least one projection of the impact tool. Wherein each of the at least one projection is a ball member, and as viewed in the axial direction, a ratio of a distance between the contact position and the outermost peripheral edge to a radius of the at least one projection is between 0.1 and 0.6.

12 Claims, 5 Drawing Sheets

(56) References Cited

U.S. PATENT DOCUMENTS

| | | | | |
|---|---|---|---|---|
| 2,751,229 | A | 6/1956 | Schultz | |
| 2,906,541 | A | 9/1959 | Du Bois | |
| 3,458,210 | A | 7/1969 | Whitehouse | |
| 4,080,734 | A * | 3/1978 | Barbour | B25B 27/0035 30/303 |
| 4,102,534 | A | 7/1978 | Benedict | |
| 4,231,581 | A * | 11/1980 | Benedict | B25D 17/08 279/81 |
| 4,692,073 | A | 9/1987 | Martindell | |
| 4,708,548 | A | 11/1987 | Taylor | |
| 4,900,202 | A | 2/1990 | Wienhold | |
| 5,013,194 | A | 5/1991 | Weinhold | |
| 5,363,835 | A | 11/1994 | Robson | |
| 10,507,568 | B2 * | 12/2019 | Phan | E02F 3/966 |
| 10,561,432 | B2 | 2/2020 | Estrella | |
| 11,305,411 | B2 * | 4/2022 | Lee | B25D 17/08 |
| 2006/0151188 | A1 | 7/2006 | Bodine | |
| 2006/0283615 | A1 * | 12/2006 | Pillers, II | B25D 17/08 173/128 |
| 2012/0319398 | A1 | 12/2012 | Schweizer | |
| 2012/0319399 | A1 | 12/2012 | Schweizer | |
| 2013/0134684 | A1 | 5/2013 | Funk | |
| 2015/0167719 | A1 | 6/2015 | Canuto | |
| 2015/0336255 | A1 * | 11/2015 | Chen | B25B 33/00 173/132 |
| 2016/0279777 | A1 * | 9/2016 | Camp | B25D 17/02 |
| 2017/0291289 | A1 * | 10/2017 | Chen | B25D 3/00 |
| 2020/0230795 | A1 | 7/2020 | Carlson | |
| 2020/0306947 | A1 * | 10/2020 | Lee | B25D 17/08 |
| 2023/0191578 | A1 * | 6/2023 | Kochie | B25D 17/02 279/9.1 |
| 2023/0364768 | A1 * | 11/2023 | Lee | B25D 17/02 |

OTHER PUBLICATIONS

AirTek; “Ajax .401 & .498 Shank Tools”; Jul. 2, 2019 (as captured by Wayback Machine Internet Archive) http://www.airtekltd.com/ajax_4.htm (Year: 2019).

* cited by examiner

IMPACT TOOL HEAD

The present invention is a CIP of application Ser. No. 17/395,185, filed Aug. 5, 2021, which is a CIP of application Ser. No. 16/579,435, filed Sep. 23, 2019, the entire contents of which are hereby incorporated by reference.

BACKGROUND OF THE INVENTION

Field of the Invention

Description of the Prior Art

Impact tools are widely used in engineering operations such as building construction or vehicle maintenance. The types of impact tools include power type and manual type. The tool head such as that in TWI468268 or TWM507829, is usually detachably and removably connected to the impact tool, and can be replaced according to different operation requirements. The conventional impact tool is provided with a connecting head, the tool head is provided with a radial flange that can be blocked by a retaining mechanism (such as a steel ball) to restrict the tool head. The tool head and the connecting head can be stably connected as their radial dimensions match with each other. However, after long-term use, the radial flange is easily deformed by repeated impact of the retaining mechanism, thereby expanding the radial dimension of the radial flange or changing the shape of the radial flange so that the connecting head can be stuck in the connecting head, which results in inconvenience in use.

US20150336255 discloses that first and second surfaces are each a part of a same smooth concave surface, the second surface does not inflect non-smoothly and downwardly from the first surface, and the second surface extends smoothly from the first surface. It is obvious that the first surface and the second surface are complementary to the ball member in shape such that the ball member contacts the first surface and the second surface in large surface contact. As such, the radial flange is easily deformed by repeated impact of the retaining mechanism, thus expanding the radial dimension of the radial flange or changing the shape of the radial flange so that the connecting head can be stuck in the connecting head, which results in inconvenience in use.

Furthermore, each of US20150336255 and US20060283615 discloses that in an axial direction the outermost peripheral edge has a length larger than a length of the edge that is connected between the outermost peripheral edge and the rod body.

The present invention is, therefore, arisen to obviate or at least mitigate the above-mentioned disadvantages.

SUMMARY OF THE INVENTION

The main object of the present invention is to provide an impact tool head which can avoid being stuck due to deformation.

To achieve the above and other objects, the present invention provides an impact tool head, configured to be disposed on a front end of an impact tool. The impact tool head includes: a rod body and a flange radially protruding from the rod body, the flange including an inclined flat surface facing toward the front end and an outermost peripheral edge, a contact position being defined as a position where the inclined flat surface contact with at least one projection of the impact tool; wherein each of the at least one projection is a ball member, as viewed in the axial direction, a ratio of a distance between the contact position and the outermost peripheral edge to a radius of the at least one projection is between 0.1 and 0.6.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
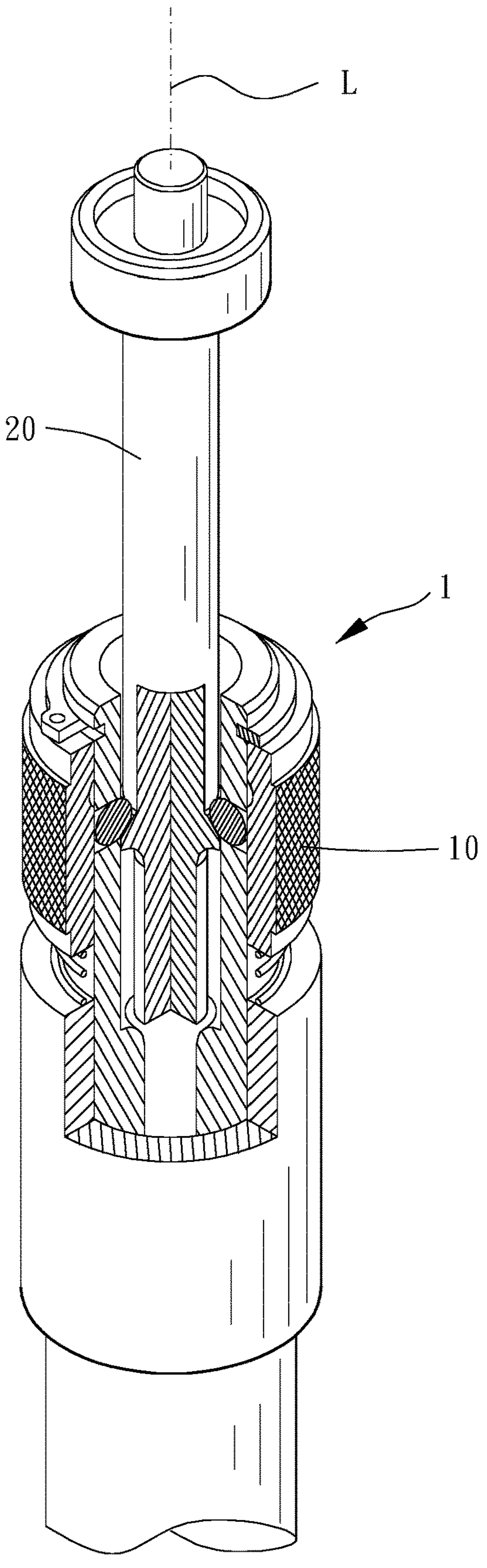
FIG. 1 is a stereogram of a preferable embodiment of the present invention.
Figure 2:
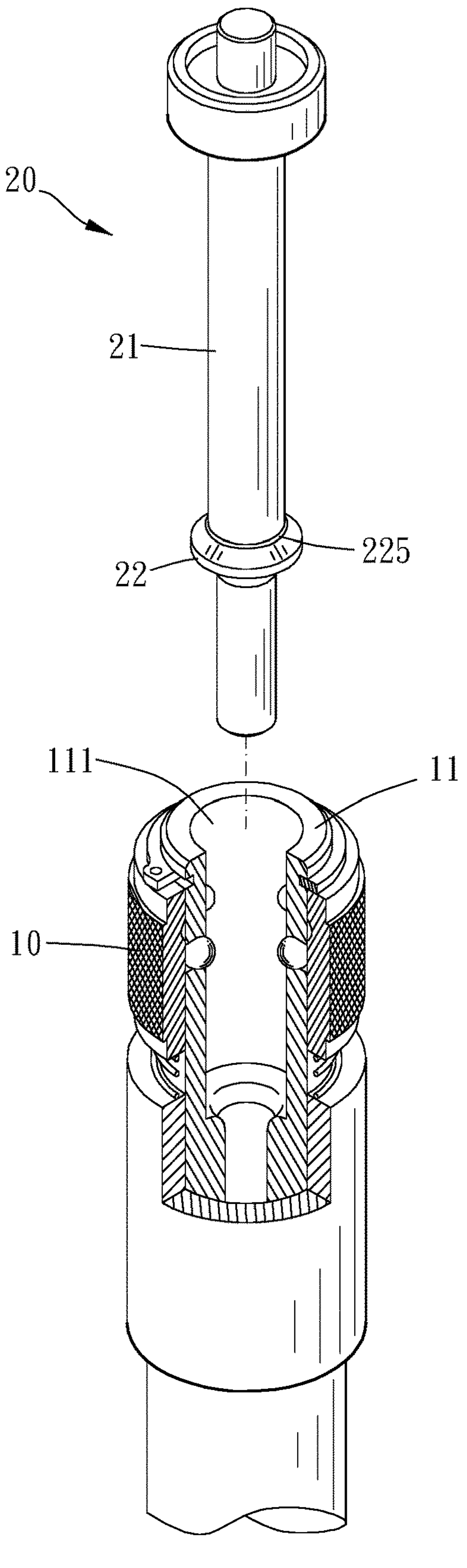
FIG. 2 is a breakdown drawing of a preferable embodiment of the present invention.
Figure 4:
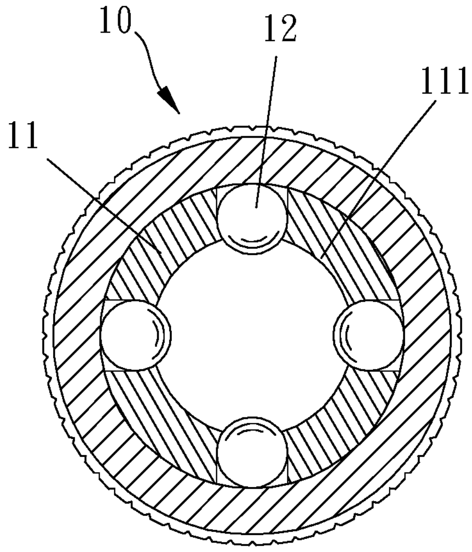
FIG. 4 is a cross-sectional view, taken along the line A-A in FIG. 3.
Figure 3:
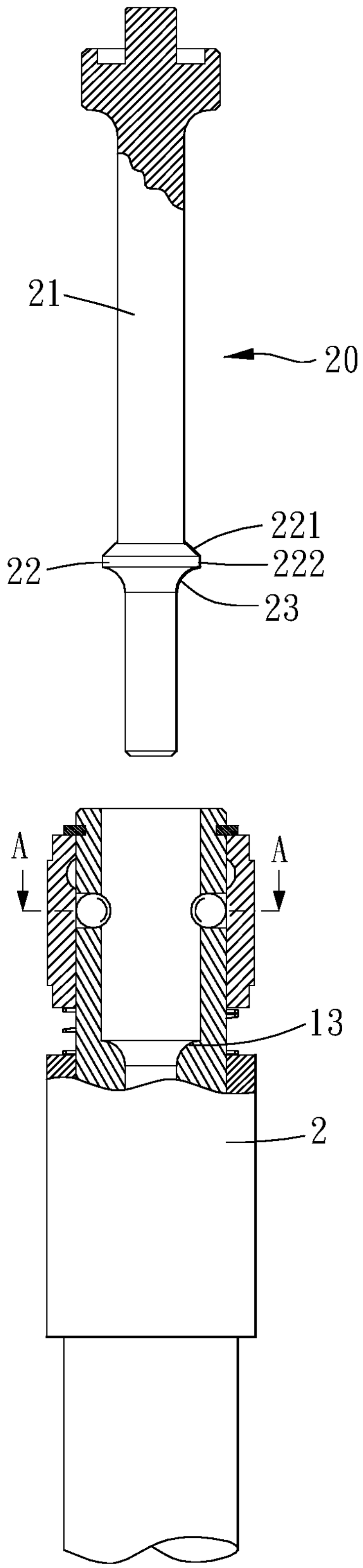
FIG. 3 is a partial cross-sectional view of a preferable embodiment of the present invention.
Figure 5:
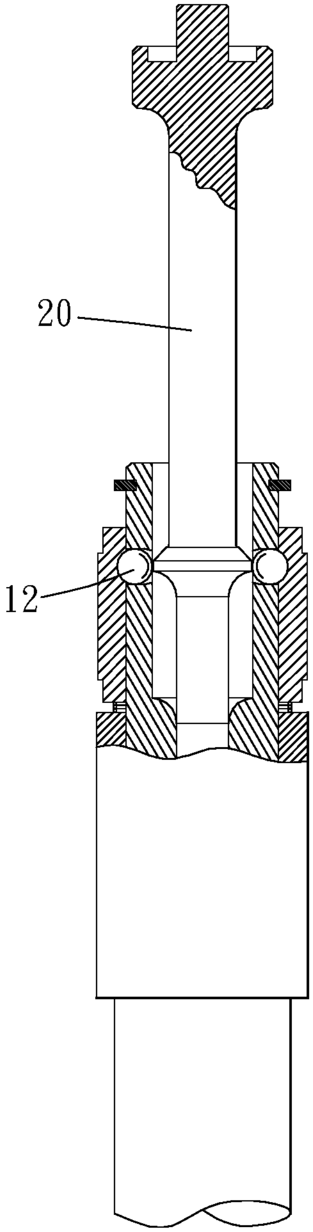
FIGS. 5 and 6 are views showing operation of a preferable embodiment of the present invention.
Figure 6:
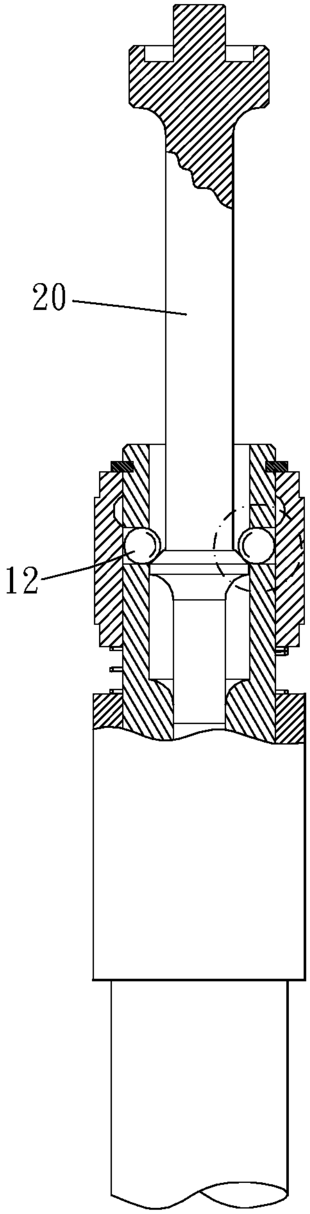
Figure 7:
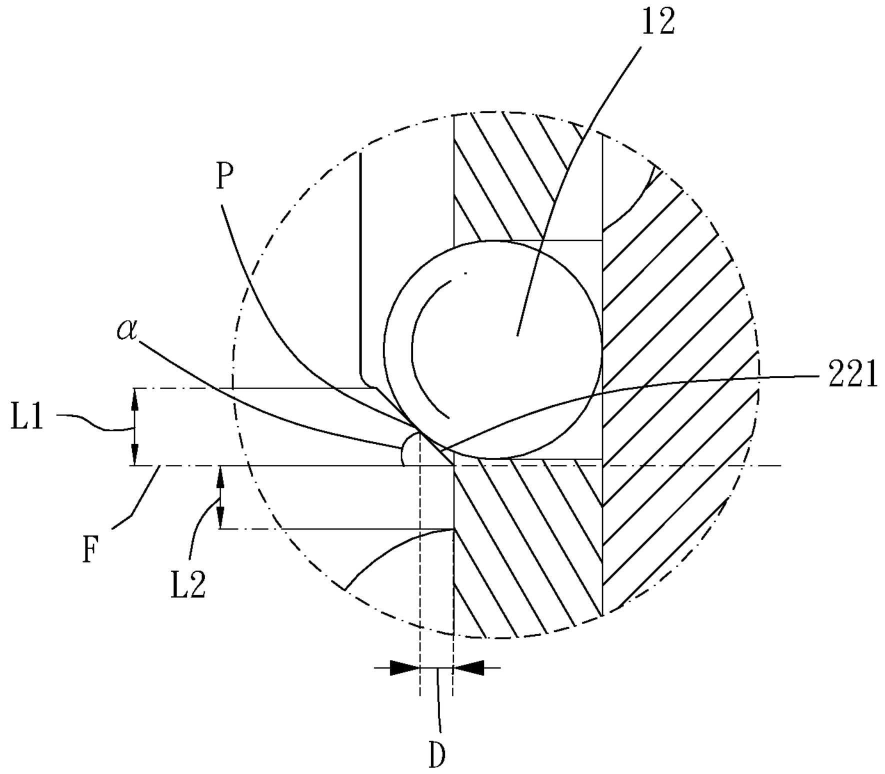
FIG. 7 is a partial enlargement of FIG. 6.

Please refer to FIGS. 1 to 8 for a preferable embodiment of the present invention. An impact tool head assembling mechanism 1 includes an engaging sleeve 10 and an impact tool head 20.

The engaging sleeve 10 is disposed on a front end of an impact tool 2 and includes a tubular wall 11 and at least one projection 12. The tubular wall 11 defines an axial direction L, and the at least one projection 12 is protrudingly and retractably disposed on an inner face 111 of the tubular wall 11. The impact tool head 20 includes a rod body 21 extending in the axial direction L and a flange 22 radially protruding from the rod body 21. The flange 22 includes an inclined flat surface 221 facing toward the front end and an outermost peripheral edge 222 connected to the inclined flat surface 221, and a contact position P is defined as a position where the inclined flat surface 221 contacts with the at least one projection 12. A reference plane F is defined as passing through the outermost peripheral edge 222 and perpendicular to the axial direction L. An included angle $\alpha$ between a line which is from the contact position P to the outermost peripheral edge 222 and the reference plane F is between 25 and 65 degrees. Whereby, the flange 22 cannot be stuck by the tubular wall 11 due to radial deformation of the flange 22. Specifically, a projection length of the inclined flat surface 221 on the axial direction L is defined as a first length L1, and in the axial direction L the outermost peripheral edge 222 has a second length L2 smaller than the first length L1. Preferably, the first length L1 is 2.5±0.05 mm, and the second length L2 is 2.1±0.05 mm.

In this embodiment, the included angle $\alpha$ is 45 degrees; the inclined flat surface 221 is a flat surface, and the flat surface has a slope, preferably, between 0.5 and 3 so that there is a suitable distance between the contact position P and the outermost peripheral edge 222. The inclined flat surface 221 and the at least one projection 12 are preferably in point contact, and thus the contact area of the at least one projection 12 and the inclined flat surface 221 is small so that the impacted deformation of the flange 22 is reduced and it allows more deformation tolerance. In other embodiments, the inclined flat surface may be a convex surface or a concave surface.

Figure 8:
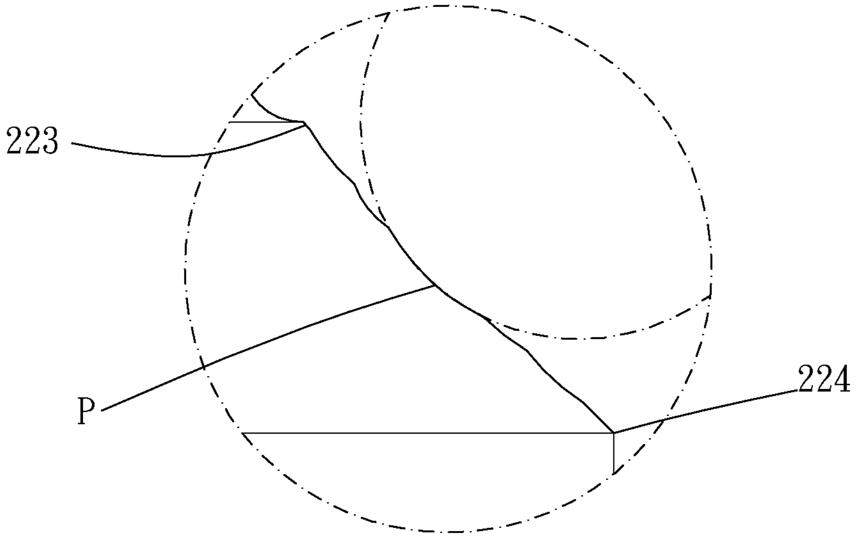
FIG. 8 is a view showing a partial enlargement of an impact tool head with impacted dents.

Each of the at least one projection 12 is a ball member. As viewed in the axial direction, a ratio of a distance D between the contact position P and the outermost peripheral edge 222 to a radius of the at least one projection 12 is between 0.1 and 0.6. With the radius of the at least one projection 12 which is relatively larger, the at least one projection 12 exerts a smaller impact force on the inclined flat surface 221 in the axial direction L so that the inclined flat surface 221 is uneasy to deform. Specifically, a diametric dimension of the flange 22 is 1.3 to 1.8 times a diametric dimension of the rod body 21 so as to stably abut against the at least one projection 12. The hardness of the at least one projection 12 (for example, HRC60) is greater than the hardness of the flange 22 (for example, HRC50), thus having good structural strength for stably abutting the flange 22; the ball member has a diameter from 6 to 10 mm; the inclined flat surface 221 includes an upper peripheral edge 223, a distance between the upper peripheral edge 223 and the outermost peripheral edge 222 is from 1.5 to 5.0 mm; a distance between the contact position P and the outermost peripheral edge 222 is from 0.75 to 2.5 mm. When the impact tool head 20 is forced to impact outward, the ball member can contact the inclined flat surface 221 in a specific range of the flange 22, the inclined flat surface 221 can occurs within the specific range of the flange 22 so that the flange 22 cannot be stuck by the tubular wall 11, as shown in FIG. 8. The inclined flat surface 221 includes a lower peripheral edge 224, and a distance between the lower peripheral edge 224 and the contact position P is less than or equal to 0.75 mm inclined flat surface. As viewed in the axial direction L, at least one third of the at least one projection 12 overlaps the inclined flat surface 221 so that the impact tool head 20 can be stably supported and so that the contact position P is distanced from the tubular wall 11 in a sufficient gap so as to allow more deformation tolerance. In this embodiment, the engaging sleeve 10 includes a plurality of said projections 12 which are peripherally separately disposed on the inner face 111, the inclined flat surface 221 and a respective one of the plurality of said projections 12 are in point contact, thus stably abutting against the impact tool head 20 on the same level or plane. Preferably, the impact tool head 20 further includes a concave surface 225 between the rod body 21 and the inclined flat surface 221, and the concave surface 225 has a radius of curvature less than or equal to 5 mm. In this embodiment, the concave surface 225 has a radius of curvature of 2.5 mm, which provides a short path for efficient force transmission.

The engaging sleeve 10 further includes a receiving hole 13 expanding toward the front end, and the impact tool head 20 further includes an abutting surface 23 receivable within the receiving hole 13 and disposed between the rod body 21 and a side of flange 22 opposite to the inclined flat surface 221. The abutting surface 23 is configured to be abutted against the impact tool 2 and has a radius of curvature (less than or equal to 10 mm) which is larger than the radius of curvature of the concave surface 225 so as to have good force transmission effect. A shape of the abutting surface 23 and a shape of the receiving hole 13 are complementary with each other so that the impact tool head 20 and the receiving hole 13 fittingly contact each other and is not easy to be damaged and so that the force transmission is efficient. Fittingly contact of the impact tool head 20 and the receiving hole 13 each other provides large contact area for distributing force on the impact tool 2, and the abutting surface 23 facilities assembling of the flange 22 to move past the at least one projection 12.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An impact tool head configured to be disposed on a front end of an impact tool, the impact tool head including:
- a rod body extending in an axial direction; and
- a flange radially protruding from the rod body, the flange including:
  - an inclined flat surface facing toward the front end; and
  - an outermost peripheral edge connected to the inclined flat surface, and
- a contact position being defined as a position where the inclined flat surface contacts with at least one projection of the impact tool;
- wherein each of the at least one projection is a ball member, as viewed in the axial direction, a ratio of a distance between the contact position and the outermost peripheral edge to a radius of the at least one projection is between 0.1 and 0.6;
- wherein a projection length of the inclined flat surface on the axial direction is defined as a first length, and in the axial direction the outermost peripheral edge has a second length smaller than the first length.

2. The impact tool head of claim 1, wherein a reference plane is defined as passing through the outermost peripheral edge and perpendicular to the axial direction, and an included angle between a line which is from the contact position to the outermost peripheral edge and the reference plane is between 25 and 65 degrees.

3. The impact tool head of claim 2, wherein the included angle is 45 degrees.

4. The impact tool head of claim 3, wherein the inclined flat surface is a flat surface, and the flat surface has a slope between 0.5 and 3.0; the hardness of the at least one projection is greater than the hardness of the flange; the inclined flat surface and the at least one projection are in point contact; the ball member has a diameter from 6 mm to 10 mm; the contact position and a distance between the outermost peripheral edge is from 0.75 mm to 2.5 mm; the inclined flat surface includes an upper peripheral edge, the distance between the upper peripheral edge and the outermost peripheral edge is from 1.5 mm to 5.0 mm; the impact tool head further includes a concave surface between the rod body and the inclined flat surface, and the concave surface has a radius of curvature less than or equal to 5 mm; the impact tool head further includes an abutting surface between the rod body and a side of the flange opposite to the inclined flat surface, the abutting surface is configured to be abutted against the impact tool and has a radius of curvature which is larger than the radius of curvature of the concave surface; as viewed in the axial direction, at least one third of the at least one projection overlaps the inclined flat surface; the inclined flat surface includes a lower peripheral edge, and a distance between the lower peripheral edge and the contact position is less than or equal to 0.75 mm; a diametric dimension of the flange is 1.3 to 1.8 times a diametric dimension of the rod body.

5. The impact tool head of claim 1, wherein the inclined flat surface is a flat surface, and the flat surface has a slope between 0.5 and 3.0.

6. The impact tool head of claim 1, wherein the inclined flat surface and the at least one projection are in point contact.

7. The impact tool head of claim 1, wherein the ball member has a diameter from 6 mm to 10 mm, and the distance between the contact position and the outermost peripheral edge is from 0.75 mm to 2.5 mm.

8. The impact tool head of claim 1, wherein the inclined flat surface includes an upper peripheral edge, a distance between the upper peripheral edge and the outermost peripheral edge is from 1.5 mm to 5.0 mm.

9. The impact tool head of claim 1, further including a concave surface between the rod body and the inclined flat surface, wherein the concave surface has a radius of curvature less than or equal to 5 mm.

10. The impact tool head of claim 9, further including an abutting surface between the rod body and a side of the flange opposite to the inclined flat surface, wherein the abutting surface is configured to be abutted against the impact tool and has a radius of curvature which is larger than the radius of curvature of the concave surface.

11. The impact tool head of claim 10, wherein the first length is 2.5±0.05 mm, the second length is 2.1±0.05 mm, and the abutting surface has a radius of curvature less than or equal to 10 mm.

12. The impact tool head of claim 1, wherein as viewed in the axial direction, at least one third of the at least one projection overlaps the inclined flat surface.

* * * * *